Feb. 13, 1940.                F. E. FENDER                2,189,979
                              FISHING TACKLE
                           Filed July 15, 1939
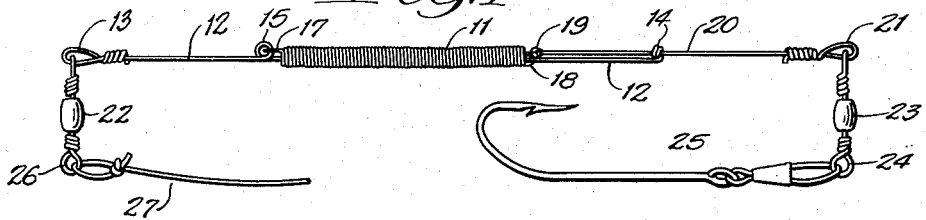
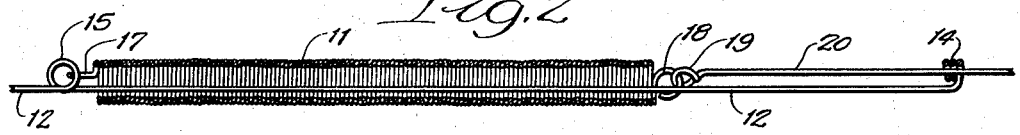
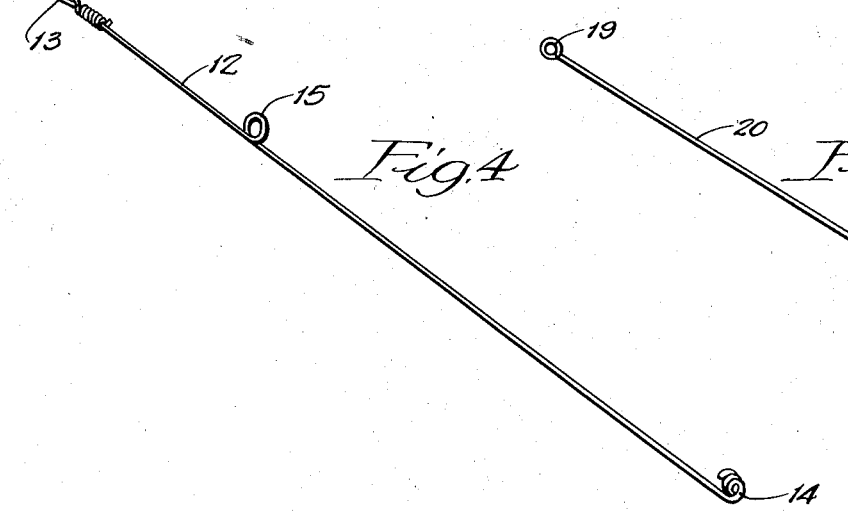
Inventor:
Ferdinand E. Fender,
By Casper W. Ooms
       Attorney.

Patented Feb. 13, 1940

2,189,979

UNITED STATES PATENT OFFICE 2,189,979

FISHING TACKLE

Ferdinand E. Fender, Evanston, Ill., assignor to Vaughan Novelty Mfg. Co. Inc., Chicago, Ill., a corporation of Illinois Application July 15, 1939, Serial No. 284,681

2 Claims. (Cl. 43—28)

This invention relates to an improvement in fishing tackle and more particularly to an improved leader designed to be used as part of a fishing line in place of the conventional leader.

An object of the invention is to provide an improved leader which can be cheaply manufactured and easily assembled.

A further object of the invention is to provide a leader which will be elastic in order that it may yield under any pull upon the hook so that shocks to which the hook is subject when struck by a fish will be gradually transmitted to the line and not with the severe impact of the strike.

A further object of the invention is to provide a leader in which the yielding element can be substantially extended, but which is so constructed that before the elastic limit of the yielding element is reached further extension thereof will be prevented.

A further object of the invention is to provide a fishing leader which will enable the fish, when striking the hook, to run a short distance with the bait and hook before the hook is forcibly driven into the flesh.

A further object of the invention is to provide a fishing leader which will yield when the hook encounters foreign objects in the water and will not forcibly draw the hook into the foreign objects but will make only a yielding engagement therewith so that the fisherman can sense contact with the foreign object and free the hook before it is deeply driven thereinto.

Further objects, advantages and capabilities of the invention will appear from the following description of a preferred embodiment thereof, taken in conjunction with the accompanying drawing, in which:

Figure 1 is an elevation of the entire leader;

Fig. 2 is a sectional elevation of the yielding element of the leader in normal position;

Fig. 3 is a sectional elevation of the yielding element in extended position;

Fig. 4 is a perspective view of one shaft of the leader which passes through the yielding element; and Fig. 5 is a perspective view of the other shaft of the leader.

Referring to the drawing, the leader as shown in Fig. 1 is made in the form of a coil spring 11 surrounding a shaft 12 which is constructed of a stiff steel wire terminating in a loop 13 at the outer end thereof and terminating in a spiral coil 14 at the other end thereof. The spiral coil 14 is formed about an axis which parallels the axis of the shaft 12. Intermediate the loop 13 and the spiral coil 14 at the extreme ends of the shaft 12 the shaft is bent to form an eye 15.

Hooked into the eye 15 is one end of the coil spring 11 formed into the eyelet 17. The other end of the coil spring 11 is formed into the eyelet 18 which is hooked to a loop 19 on the inner end of the shaft 20 which passes through and is slidable in the spiral coil 14 and terminates in the loop 21.

The loops 13 and 21 which form the outer ends of the leader assembly are attached to conventional swivels 22 and 23 which are well-known accessories in fishing tackle and need not be further described.

The swivel 22 is attached to a fishing line 27 which is looped through the eyelet 26 in which the swivel 22 terminates. The swivel 23 is attached to the hook 25 which is drawn through the eyelet 24.

The operation of the fishing leader is illustrated in Figs. 2 and 3 which show sectional elevations of the coil spring 11 in normal position in Fig. 2 and in extended position in Fig. 3.

As shown in Fig. 2, the shaft 12 passes loosely through the coil spring 11, one end of which is attached to the loop 15 intermediate the shaft 12 by the eyelet 17 formed at the end of the coil spring. Similarly, the coil spring 11 is attached to the other shaft 20 of the leader by means of the eyelet 18 at one end of the coil spring 11, which is linked in the loop 19 at the inner end of the shaft 20. As the shaft 20 is slidable through the spiral coil 14 formed at the inner end of the shaft 12 the two shafts 20 and 12 are movable along the same longitudinal axis. Movement of the shaft 20 with respect to the shaft 12 to extend the length of the leader is resisted by the coil spring 11 which draws the shaft 20 through the spiral coil 14 until the coil spring 11 is at rest.

If the shaft 12 is held substantially immovable, as it normally would be when attached to the fishing line, any pull upon the shaft 20, such as would be transmitted by a strike of a fish upon the hook 25 or upon the hook catching upon logs, weeds or other obstacles in the water, will immediately draw the shaft 20 through the spiral coil 14 against the resistance of the coil spring 11. The spring 11 in expanding would yield to the initial shock of the blow upon the hook 25 and would resist continued separation of the two shafts 12 and 20 until the eyelet 19 encountered the spiral coil 14 formed upon the end of the shaft 12, whereupon further relative movement of the two shafts 12 and 20 would be prevented by engagement of the eyelet 19 against the spiral coil 14. When the coil spring 11 is fully extended the respective positions of the parts are as shown in the sectional view, Fig. 3.

The restriction upon any further extension of the coil spring 11 not only prevents stretching of the spring beyond its elastic limits, but is also effective in making the engagement of the hook 25 with any obstacle it encounters gradual. Thus, when a fish strikes the hook 25, the fish will not be startled and frightened away by the unyielding pressure of the hook within its mouth, but will be able to draw the hook a short distance before resistance becomes sufficiently great to force the hook deeply into its flesh. When the coil spring 11 has been extended to the full extent permitted by the spiral coil 14, the leader will become unyielding and the pressure of the hook 25 within the fish's mouth will be wholly controlled by the fisherman's manipulation of his tackle.

The fish is thus permitted to run a very short distance and to get the hook well within its mouth before the pull upon the line becomes evident. This is the effect which every fisherman attempts to produce by giving the fish an opportunity to run with the bait before reeling in and drawing the line taut so that the hook is pulled into the flesh.

Similarly, when the hook encounters a log or other obstacle it does not do so with the full pull of the line against the hook, but the hook is drawn yieldingly against the obstacle and is not driven by impact into it. As soon as any engagement of the hook with a foreign obstacle is felt the line can be released and the hook permitted to free itself before the hook is drawn forcibly into the obstacle.

Having thus described my invention, what I claim as new and desire to secure by Letters Patent is:

1. A fishing leader comprising two shafts capable of relative longitudinal movement with respect to each other, a loop on the outer end of each shaft, a coil spring connected to the inner end of the first shaft and intermediate the ends of the second shaft, and means upon the inner end of the second shaft to restrict the extension of said coil spring.

2. A fishing leader comprising a shaft, a loop at the outer end of said shaft, a spiral coil at the inner end of said shaft, a coil spring surrounding said shaft and attached at one end to said shaft intermediate the loop and the spiral coil, and a second shaft slidable through said spiral coil and longitudinally movable relative to said first shaft, said second shaft being provided with a loop at the outer end thereof and being secured at the inner end thereof to the other end of said coil spring.

FERDINAND E. FENDER.